United States Patent [19]
Fuoco et al.

[11] Patent Number: 5,452,429
[45] Date of Patent: Sep. 19, 1995

[54] ERROR CORRECTION CODE ON ADD-ON CARDS FOR WRITING PORTIONS OF DATA WORDS

[75] Inventors: Daniel P. Fuoco, Boca Raton, Fla.; Christopher M. Herring; Mark W. Kellogg, both of Essex Junction, Vt.; Jorge E. Lenta, Boca Raton, Fla.

[73] Assignee: International Business Machines Corporation, Armonk, N.Y.

[21] Appl. No.: 154,191

[22] Filed: Nov. 17, 1993

[51] Int. Cl.⁶ .............................................. G06F 11/10
[52] U.S. Cl. ............................. 395/182.04; 371/40.2; 364/DIG. 1; 364/DIG 2; 364/243; 364/265; 364/265.3; 364/266.3; 364/943.9; 364/944.9; 364/945.6; 395/432; 395/442; 395/482; 395/494
[58] Field of Search ................... 364/DIG. 1 MS File, 364/DIG. 2 MS File; 371/10.1, 10.2, 10.3, 21.1, 21.2, 21.3, 30, 37.7, 40.1, 40.2, 40.3, 40.4; 395/400, 425, 575, 700, 750

[56] References Cited

U.S. PATENT DOCUMENTS

| | | | |
|---|---|---|---|
| 4,249,253 | 3/1981 | Gentili et al. | 371/38 |
| 4,468,731 | 8/1984 | Johnson et al. | 364/200 |
| 4,545,010 | 10/1985 | Salas et al. | 364/200 |
| 4,561,095 | 12/1985 | Khan | 371/38 |
| 4,780,809 | 10/1988 | Woffinden et al. | 364/200 |
| 4,789,967 | 12/1988 | Liou et al. | 365/189 |
| 4,811,299 | 3/1989 | Miyazawa et al. | 365/201 |
| 4,817,095 | 3/1989 | Smelser et al. | 371/38 |
| 4,896,289 | 1/1990 | Svinicki et al. | 364/900 |
| 4,951,248 | 8/1990 | Lynch | 364/900 |
| 4,951,254 | 8/1990 | Ontrop et al. | 365/201 |
| 5,046,049 | 9/1991 | Choi et al. | 365/201 |
| 5,051,995 | 9/1991 | Tobita | 371/21.1 |
| 5,067,110 | 11/1991 | Runaldue | 365/189.07 |
| 5,289,477 | 2/1994 | Lenta et al. | 371/37.7 |

*Primary Examiner*—Robert B. Harrell
*Attorney, Agent, or Firm*—Calfee, Halter & Griswold

[57] ABSTRACT

The present invention provides a computer system and method of using the same. Add-on memory cards for the system are provided which cards have error correction code logic on the card, and logic to do partial writes of data words. The system has a central processing unit (CPU), a BUS interconnecting the CPU and the add-on memory cards. The CPU or associated components are configured to write data and read data from the add-on memory as several data bytes constituting data words. The system is further configured either within the CPU or as a separate function to generate parity bits associated with each of the bytes of data the CPU writes to the add-on memory and to read parity bits associated with data the CPU reads from the add-on memory and regenerate new parity bits and compare the newly generated parity bits with the original parity bits to detect data errors on data read from the add-on memory. The system itself does not contain error correction code (ECC). The add-on memory has ECC logic to identify any byte having a single bit error in the data bytes or the parity bits written by the CPU to the add-on memory and to correct all single bit errors in data read from the add-on memory to the CPU. The error correcting code includes logic to generate parity bits in the data bytes written by the CPU to the add-on memory and logic to compare the parity bits written by the CPU with those generated by the error correcting code logic.

16 Claims, 6 Drawing Sheets

ERROR CORRECTION CODE ON ADD-ON CARDS FOR WRITING PORTIONS OF DATA WORDS

RELATED APPLICATIONS

Patent application Ser. No. 08/154,193, filed Nov. 17, 1993, entitled "Initialization Methodology for Computer System Having Error Correction Code on Add-On Cards for Writing Portions of Data Words"; and patent application Ser. No. 08/154,192, filed Nov. 17, 1993, entitled "Error Correction Code With Write Error Preservation for Add-on Memory".

FIELD OF THE INVENTION

This invention relates generally to the detection and preservation of write errors and the correction of read errors for parity systems that write to and read from add-on memory in computer systems. In even more particular aspects, this invention relates to error correction code logic and add-on memory that allows the detection and preservation of detected uncorrectable errors occurring during the write cycle of a parity type CPU and allows for correction of all single bit errors occurring during the read cycle when the CPU is reading from the add-on memory and which allows writing to the CPU of partial data words while maintaining an error correction code capability.

BACKGROUND OF THE INVENTION

In a related application entitled "Error Correction Code With Write Error Preservation for Add-on Memory", a system and method is disclosed which permits add-on memory cards to contain error correction code in which data words are comprised of multiple data bytes. However, the system disclosed in this related application can function as disclosed only when an entire data word is written which includes all of the data bytes since bits from each of the data words are included in generating the check bits.

SUMMARY OF THE INVENTION

According to the present invention, a computer system and method of using the same is provided in which add-on memory cards are provided which have error correction code logic on the card, and logic to do partial writes of data words. The system has a central processing unit (CPU), and a BUS interconnecting the CPU and the add-on memory cards. The CPU or associated components are configured to write data and read data from the add-on memory as several data bytes constituting data words. The system is further configured either within the CPU or as a separate function to generate parity bits associated with each of the bytes of data the CPU writes to the add-on memory and to read parity bits associated with data the CPU reads from the add-on memory and regenerate new parity bits and compare the newly generated parity bits with the original parity bits to detect data errors on data read from the add-on memory. The system itself does not contain error correction code (ECC). The add-on memory has ECC logic to identify any byte having a single bit error in the data bytes or the parity bits written by the CPU to the add-on memory and to correct all single bit errors in data read from the add-on memory to the CPU. The error correcting code includes logic to generate parity bits in the data bytes written by the CPU to the add-on memory and logic to compare the parity bits written by the CPU with those generated by the error correcting code logic.

The error correcting code logic further includes logic or structure which allows for writing less than an entire data word, i.e. writing bytes to a data word which do not constitute the entire data word and still maintain the error correcting code capability for the entire data word. This capability takes the form of providing for a read-modify-write (R-M-W) function when less than the entire data word is being written so that check bits will be properly written even when writing only a partial data word and for the system to determine when a R-M-W function is to be performed and adjust the necessary timing.

The data bytes are stored in a first format in the add-on memory when each newly generated parity bit compares with each corresponding originally written parity bit and in a second format when at least one newly generated parity bit does not compare with the corresponding originally written parity bit. The first and second formats can be preferably accomplished by using one of the bits in the transmission as a flag to indicate the format in which the stored data is being flagged when an additional unused bit is available for this purpose. However, some other flag device, such as drawing a certain line high or low can be used. The logic also includes logic to correct any single bit error in the data words in data being read out of memory to the CPU when the data bytes are stored in the first format, and logic to identify any byte or bytes on which the corresponding parity bit does not compare when the data bytes are read from memory when the data bytes are stored in the second format. Thus, write errors to add-on memory in any data byte are identified and single bit read errors from add-on memory are corrected. The logic also preferably includes logic circuits to identify all errors in two bits and some errors in more than two bits in the read cycle from the add-on memory. The invention also includes logic to detect whether the add-on card contains a read-modify-write type of system for writing partial data words which preferably includes some physical configuration of the memory card which prevents insertion of a card having ECC capabilities to a machine which is not adapted to utilize a card having such ECC capabilities. Expressed another way, if a system has internal to it ECC capabilities, it would not be compatible with a card having ECC capabilities on the card. Hence insertion of a card having an ECC capability on the card into a system having ECC capabilities internal to the system is prevented.

DESCRIPTION OF THE PREFERRED EMBODIMENT

The preferred embodiment will be described in the environment of an IBM Personal Computer using an Intel 80386 or 80486 microprocessor and with DRAM cards or single in-line memory modules (SIMMs) provided as add-on memory. For the purpose of this description, the system will be described as it is used with a CPU capable of generating parity bits for the bytes of information that it writes and also reading and comparing parity information read from storage. In the preferred embodiment, the address locations in add-on memory are assumed to be 40 bits wide and the data words are written as 4 byte strings with 7 check bits generated thus accounting for 39 of the possible 40 bits in each address. Such a system is conventional and need not be described further. In the preferred embodiment, the 40th bit is used as a flag bit for the syndrome decode as will be described later.

Figure 1:
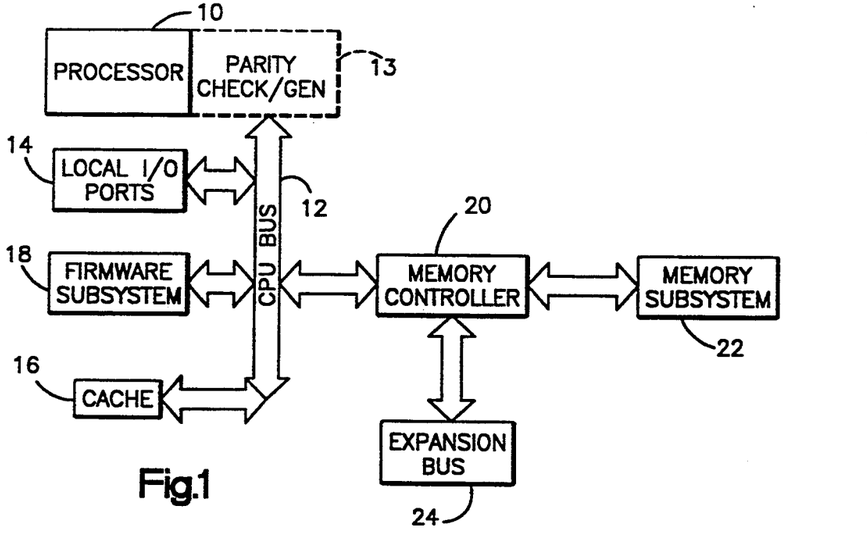
FIG. 1 is a high-level diagram showing the interconnection of a CPU BUS and add-on memory and an add-on memory card according to this invention.
Figure 1A:
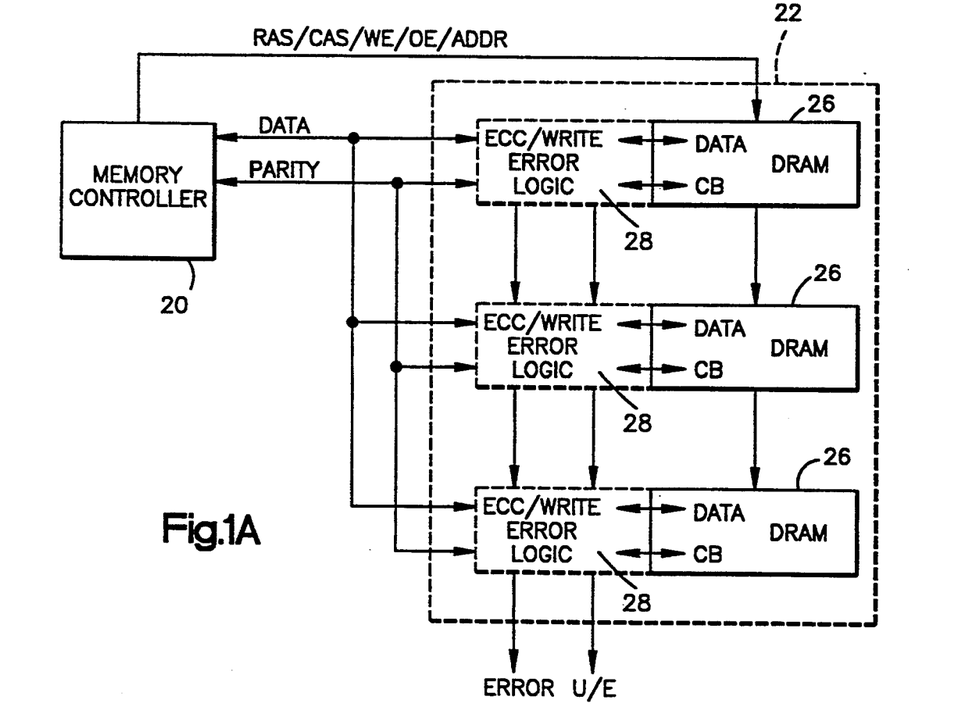
FIG. 1A is a block diagram of the interface of the memory controller with various add-on memory cards with ECC.
Figure 1B:
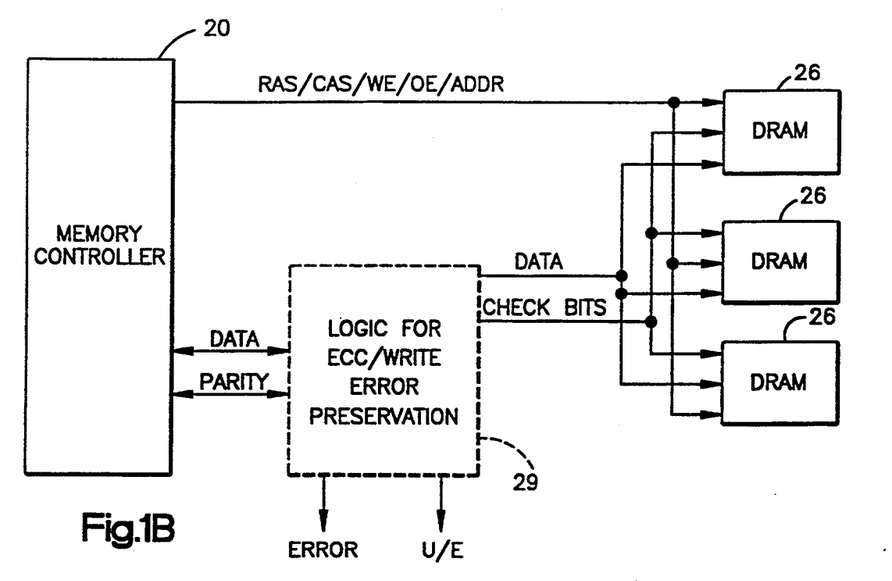
FIG. 1B is a high level block diagram of the memory interface with a memory controller using a single ECC unit for all DRAM or SIMM cards.
Figure 2:
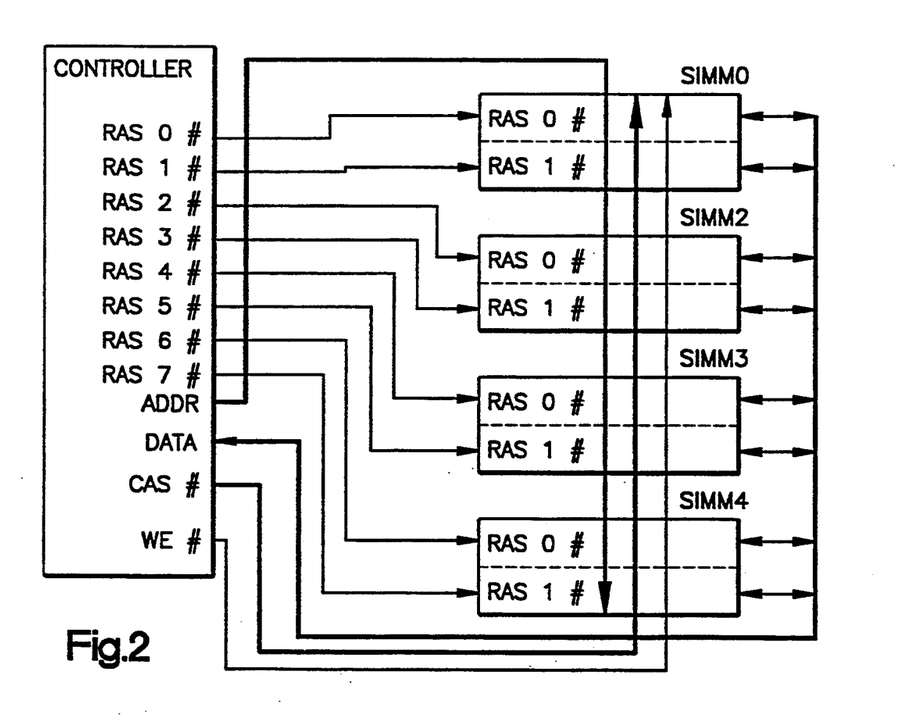
FIG. 2 is a high-level block diagram of a memory interface with the memory controller and parts of the logic on each DRAM card.

As can be seen in FIG. 1, there is provided a central processing unit (CPU) 10 which is connected to a CPU or system bus 12. A parity generation and check unit 13 is also provided which generates or checks parity of data being either written by or read by the CPU 10 to or from the bus 12. The CPU bus may also have local I/O ports 14, CACHE memory 16, and firmware subsystems 18 associated therewith. A memory controller 20 is also connected to the system bus 12, coupling it to a memory subsystem 22, and also normally to an expansion bus 24 if one is present. The memory subsystem 22 is typically comprised of SIMMs or a plurality of DRAMs 26, each of which is provided with error correction code logic (ECC) 28 of this invention as shown in FIG. 1A. It should be noted that a single ECC unit 29 could be used for all DRAM cards as shown in FIG. 1B. In either case, the ECC unit 28 or 29 operates the same.

As indicated above, the CPU 10 is capable of writing data onto the bus 12 which in turn will be conveyed to the correct memory address in subsystem 22 by the memory controller 20. Upon writing data by the CPU 10, parity bits are generated for each byte of information written to memory by the parity generating and checking device 13 which also checks parity on information read from the memory subsystem 22 during a read cycle to determine parity error. The memory controller also provides the necessary signals, such as Row Activation Strobe (RAS), Column Activation Strobe (CAS), Write Enable (WE), Output Enable (OE), and Address (ADDR), etc. to the memory subsystem 22 as shown in FIGS. 1A and 1B. The memory controller reads and writes both data and parity to each of the DRAM cards 26, also as shown in FIGS. 1A and 1B.

The error correction code logic includes logic which will store the parity bits written by the CPU on a "write" cycle. The ECC logic will also calculate 7 check bits for each data word. Each memory location in the card, which may extend to gigabyte depth, stores a 4 byte data word, the associated 7 check bits and the flag bit for each data word. The error correction code also can regenerate the check bits when the stored word and associated check bits are read from memory. If a single bit error occurs in the reading of the data, the ECC will correct this error before passing the data with good parity to the CPU on the CPU read cycle if the data stored was properly written and uncorrupted. If the data stored was corrupted or bad data, the logic will force a "bad" parity bit or "inverted" bit associated with any byte which showed a write error before it passes the bytes back to the CPU on a read cycle. This is shown in the application Ser. No. 08/154,192, filed Nov. 17, 1993 entitled "Error Correction Code with Write Error Preservation for Add On Memory".

In systems of the present invention, a configuration of the memory is such and the operation of the CPU is so arranged that the data is stored in memory, arranged in four data byte words with data bits in all of the four data byte words participating in the generation of check bits; i.e. the data bits in any given data byte may be used to generate check bits for other data bytes. In this case seven check bits are used to provide error correction for any single bit error in a four byte data word. If all of the data bytes are to be written, then the operation is as described in application Ser. No. 08/154,192, filed Nov. 17, 1993, entitled "Error Correction Code with Write Error Preservation for Add-on Memory". However, when reading or writing of less than the full four bytes of data and generating and comparing check bits, this cannot be done by simply reading directly or writing directly only those bytes which are to be rewritten and leaving the remaining bytes undisturbed since bits in any of the four data bytes (i.e. any of the 32 bits irrespective of the data byte in which they reside) may be used to generate the check bits for a given data byte. Therefore, when less than all the data bytes are to be rewritten, it is necessary to implement a read-modify-write (R-M-W) cycle. What is done in such a scheme is that when these newly written data bytes are generated by the CPU, the full data word is read from the address in memory where they are stored and multiplexed with the newly written data bytes. Check bits are then generated based on the newly written data bytes and those which were previously written and read and which were multiplexed to provide the new data word.

Figure 3:
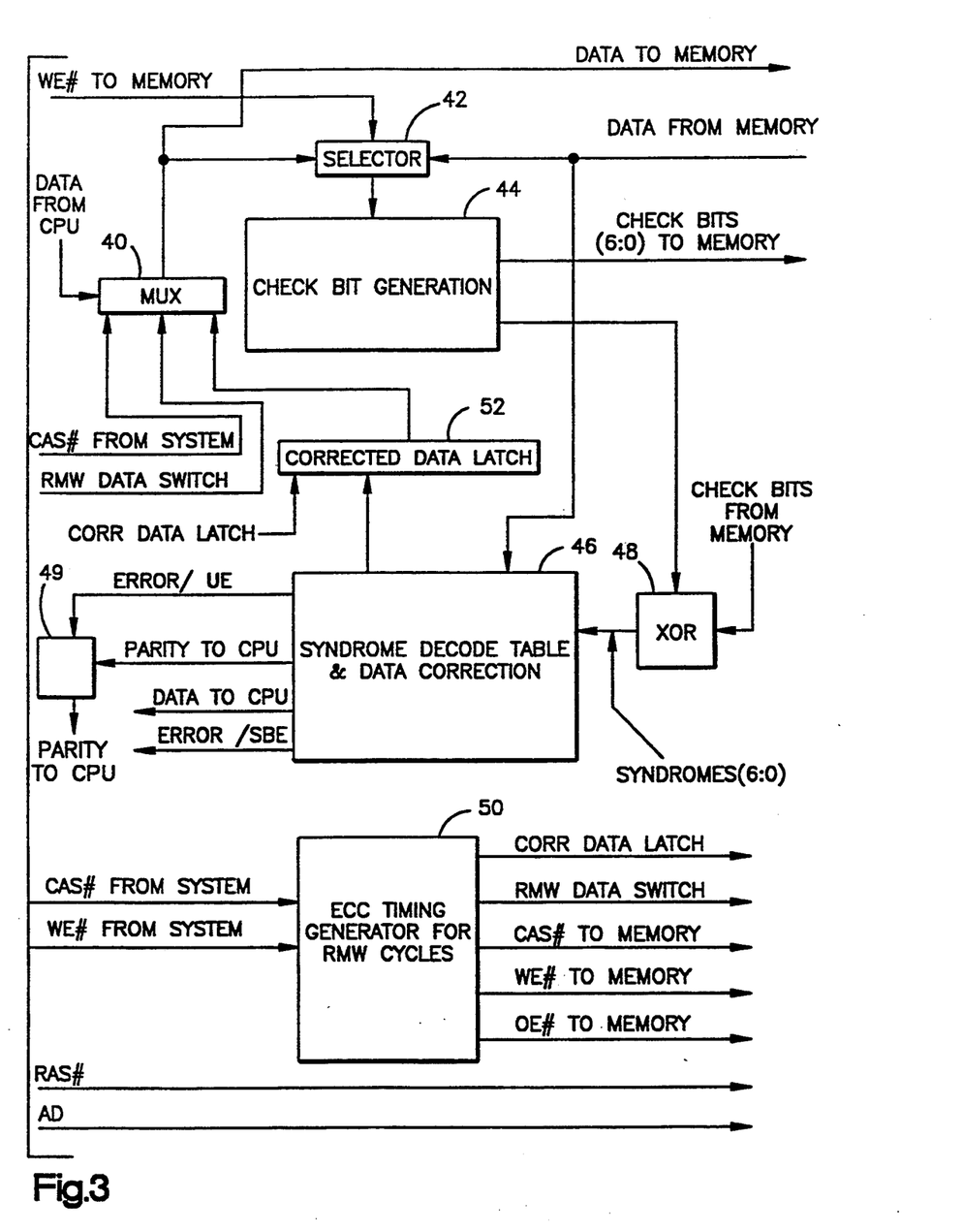
FIG. 3 is a flow diagram showing the error correction system for a memory interface written for an entire word and utilizing a read-modify-write cycle for partial writes.

As can be seen in FIG. 3, data is written from the CPU to a multiplexer or selector 40 which in turn writes the data to memory. As will be described presently, the CAS line from the system will activate the multiplexer when required to multiplex the newly written data bytes with the data bytes read from the memory on the R-M-W write cycle and initiate the read-modify-write cycle. If, on the other hand, the entire data word, (i.e. all four bytes) is being rewritten there is no necessity for having a read-modify-write cycle and the entire four byte data word is written directly to memory. The data which is being written is delivered through a selector or multiplexer 42 to check bit generator 44. The check bit generator 44 generates check bits zero to six and delivers the generated check bits to memory. If the data word being written is an entire four byte data word the generation of the check bits is the same as described in said co-pending application "Error Correction Code With Write Error Preservation for Add-On Memory". Briefly, the check bits are generated as shown in Table 1 below.

are XOR'd to provide syndrome bits to syndrome decode logic table 46.

The decode logic table 46 provides the function of error correction of single bit read errors and detection of all double bit detect errors, and delivers the output to XOR parity logic 49 which inverts the parity bit to the

TABLE 1

GENERATION OF CHECK BITS

| Generated Check Bits | Parity | Participating Data Bits | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| CB0 | NOR |   | X |   | X |   | X |   |   | X |   | X |   |   | X |   |   |
| CB1 | NOR | X | X | X | X | X | X | X | X |   |   |   |   |   |   |   |   |
| CB2 | NOR |   |   | X | X | X | X |   |   |   | X | X | X | X | X | X | X |
| CB3 | NOR | X | X | X |   |   |   |   | X |   |   | X | X | X | X |   |   |
| CB4 | NOR | X |   |   |   | X |   |   |   |   | X | X | X |   |   |   | X |
| CB5 | NOR |   |   |   |   |   |   |   |   |   | X |   |   |   | X |   |   |
| CB6 | NOR |   |   |   |   |   | X | X | X |   |   |   |   |   | X | X | X |

| Generated Check Bits | Parity | Participating Data Bits | | | | | | | | | | | | | | | |
|---|---|---|---|---|---|---|---|---|---|---|---|---|---|---|---|---|---|
| | | 16 | 17 | 18 | 19 | 20 | 21 | 22 | 23 | 24 | 25 | 26 | 27 | 28 | 29 | 30 | 31 |
| CB0 | NOR | X | X | X |   |   |   | X |   |   | X | X | X | X |   |   |   |
| CB1 | NOR | X |   |   | X |   |   |   |   | X | X | X |   |   |   |   | X |
| CB2 | NOR |   |   |   |   |   |   |   |   | X |   |   |   | X |   |   |   |
| CB3 | NOR |   | X |   | X |   |   | X |   |   | X |   | X |   |   | X |   |
| CB4 | NOR | X | X | X | X | X | X | X | X |   |   |   |   |   |   |   |   |
| CB5 | NOR |   |   | X | X | X | X |   |   |   | X | X | X | X | X | X | X |
| CB6 | NOR |   |   |   |   |   | X | X | X |   |   |   |   |   | X | X | X |

In Table 1, the participating data bits are labeled from 0 to 31. The first 8 data bits are the data bits for the first byte, and the next 8 bits are the data bits for the second data byte, etc. The 7 check bits are generated by XNORing the participating data bits as indicated by the x's in the table. Each check bit is generated by using a unique pattern of data bits in the data word such that when the check bits are regenerated later and the regenerated check bits compared with the original check bits, a single bit error in any data bit or check bit will be identified uniquely as to its location. This type of error correction code per se is known in the art. It should be noted that in generating check bit 1 all of the bits of data byte 1, i.e. bits 0 through 7 are included, check bit 2 is generated by including all of the data bits in byte 2, i.e. bits 8 through 15, check bit 3 includes all of the eight data bits in byte 3, i.e. data bits 16 through 23, check bit 4 is generated including data bits 24 through 31. It will be apparent to one skilled in the art that using only these data bits which correspond to the data bits in each data word that a parity bit will be generated for each data word, i.e. that bits 0 through 7 forming check bit 1 constitute a parity bit for byte 1, that data bits 8 through 15 constitute a parity bit for byte 2, data bits 16 through 23 constitute a parity bit for the byte 3 and data bits 24 through 31 constitute a parity bit for the data byte 4.

When the data is read in four byte wide complete data words, it is read and the data and check bits compared as follows.

The data stored in memory together with the check bits and system flag are read from memory as shown in FIG. 3 with the arrows flowing from right to left. The data from memory is read to the selector 42 and also to an error correcting syndrome decode logic table 46. The check bits in memory are read through XOR gate 48 to the error correcting syndrome decode logic table 46. The read data is delivered from the selector 42 to the check bit generator 44. The check bit generator 44 delivers newly generated check bits to the XOR gate 48 which together with the check bits read from memory system if an error occurs on the UE pin. If there was a single bit error, the syndrome decode logic table 46 will correct the error, and if there is multiple bit errors, this will be transmitted to the parity logic 49 which will force a bad parity bit signal. The functioning of the data correcting syndrome decode table 46 is shown in Table 2 which is used to determine whether an error occurred in the read data word. The detection of errors can be reported if desired. This can be done by supplying a signal to a pin on a card (e.g. Pin No. 66 on an IBM SIMM) if a correctable error has occurred, and to another pin (e.g. Pin No. 71 on an IBM SIMM) if an uncorrectable error has occurred.

TABLE 2

SYNDROME DECODE TABLE WITH FLAG NOT SET

| SYNDROME BITS | | | | | S6 | 0 | 1 | 0 | 1 | 0 | 1 | 0 | 1 |
|---|---|---|---|---|---|---|---|---|---|---|---|---|---|
| | | | | | S5 | 0 | 0 | 1 | 1 | 0 | 0 | 1 | 1 |
| S0 | S1 | S2 | S3 | S4 | | 0 | 0 | 0 | 0 | 1 | 1 | 1 | 1 |
| 0 | 0 | 0 | 0 | | * | CB6 | CB5 | | CB4 | | | 21 |
| 0 | 0 | 0 | 1 | | CB3 | | | 30 | | 22 | 19 | |
| 0 | 0 | 1 | 0 | | CB2 | | | | | 15 | 8 | |
| 0 | 0 | 1 | 1 | | | 13 | 12 | | 10 | | | |
| 0 | 1 | 0 | 0 | | CB1 | | | 31 | | | 20 | |
| 0 | 1 | 0 | 1 | | | 7 | 25 | | 0 | | | |
| 0 | 1 | 1 | 0 | | | 5 | 24 | | 4 | | | |
| 0 | 1 | 1 | 1 | | 2 | | | | | | | |
| 1 | 0 | 0 | 0 | | CB0 | | | 29 | | 23 | 18 | |
| 1 | 0 | 0 | 1 | | | | 27 | | 17 | | | |
| 1 | 0 | 1 | 0 | | | 14 | 28 | | 9 | | | |
| 1 | 0 | 1 | 1 | | 11 | | | | | | | |
| 1 | 1 | 0 | 0 | | | 6 | 26 | | 16 | | | |
| 1 | 1 | 0 | 1 | | 1 | | | | | | | |
| 1 | 1 | 1 | 0 | | 3 | | | | | | | |
| 1 | 1 | 1 | 1 | | | | | | | | | |

*No error detected
Blanks in table indicate multiple errors

If no error occurred, all syndrome bits will be 0. If a single bit error in the data word is detected, the exact bit location will be identified and that bit reversed or "flipped" to correct the data and read the corrected data into the CPU as correct data from the decode table 46. How this is done is demonstrated in the syndrome Decode table shown in Table 2. The syndrome decode table indicates that when the check bits are each exclusively OR'ed with each other, if all of them compare the syndrome bits will be all logic 0; this location is shown in the upper left hand corner of the table indicating that the data read is uncorrupted from that as written. Each place where there is an indication in the table represents the detection of a single bit error in one of the 4 bytes or one of the seven check bits. In any of these cases, this single bit error can be corrected and the correct data passed to the CPU through parity logic 49 on a read cycle. If, for example, data bit no. 1 were the corrupted bit, the corresponding syndrome bits S0, S1 and S3 would be logic "1" while syndrome bits S2, S4, S5 and S6 would be at logic 0. Thus, a reading of this code would indicate that data bit 1 had been corrupted and it is the only corrupted data bit. This data bit is changed either from "0" to "1" or "1" to "0" whichever it should be Similarly, if check bit 4 is the bit that was corrupted, then syndrome bit S4 will be the only one that is a 1 and syndrome bits S0, S1, S2, S3, S5 and S6 would read 0, this code indicating that the check bit 4 was the one that is corrupted, and no correction of the data need occur since this is merely a check bit which will be discarded. Similarly, if syndrome bits S4, S5 and S6 do not compare and syndrome bits S0, S1, S2 and S3 do compare, this would represent data bit 21 as can be seen in the upper right hand corner of the table.

All of the blanks in the table, i.e., where there is neither an asterisk nor a bit location designated, represent a multiple bit error and in this case the information of multiple bit errors is delivered to logic 49 and passed on to the CPU indicating corrupted data since with this particular error correcting scheme no correction is possible for multiple bit errors. A decode to a non-zero syndrome that does not fall into an identified place in the table will identify all 2 bit errors and certain errors involving more than 2 bits. The data will be returned to the XOR logic 49 indicating uncorrectable error (UE) and force "bad" parity.

If a write is to be accomplished wherein less than an entire four byte wide data word is to be written, the read-modify-write operation must be performed. As indicated above, the read-modify-write operation takes place by reading the complete data word and multiplexing it with the data bytes which are being rewritten and from this new four byte data word regenerating check bits, and then storing the rewritten data word in memory along with the newly generated check bits. This is accomplished as follows. Still referring to FIG. 3, error correction code timing generator logic 50 for a read-modify-write cycle is provided. The purpose of this logic is to provide an additional cycle or cycles which are necessary to perform the operation of reading the data bytes from memory and multiplexing them with the data bytes which are to be rewritten. This requires an extra cycle to complete and is accomplished by the timing generator 50 in a manner which will be described presently.

The entire word which contains those data bytes which are not to be overwritten is read from memory into the syndrome decode table 46. The syndrome decode table 46 will check for errors and correct any single bit error and indicate multiple bit errors. The entire correct data word is then written to the corrected data latch 52. The latch 52 is switched "on" when the read-modify-write cycle is actuated and these data bytes stored in the latch 52, together with the data bytes from the CPU which are being newly written, are supplied to the multiplexer 40. The multiplexer 40 is actuated during the read-modify-write cycle by the CAS active line from the system as will be described presently. This will multiplex the newly written data bytes with the data bytes stored in the corrected data latch 52 to thereby form a new four byte data word comprised of the selected bytes to be rewritten and the newly written bytes. The multiplexed data forming the new four byte data word is then read to the selector 42 and also written to memory. The selector 42 then provides the newly generated four byte data word to the check bit generator 44 which generates seven new check bits which are then written to memory as previously described according to Table 1. Thus the newly written four byte data word together with the newly generated check bits are stored in memory. The reading and writing of the newly generated data word is then handled as previously described according to Table 2.

Figure 4:
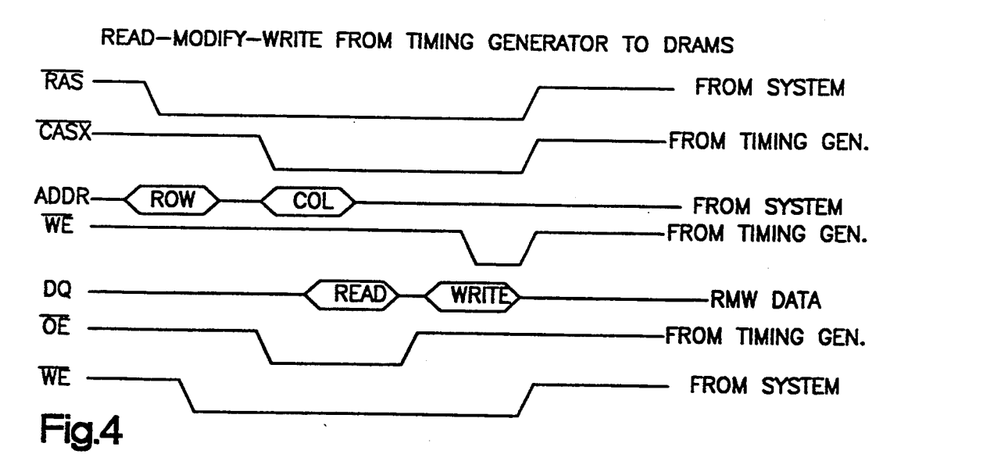
FIG. 4 is a timing diagram for a read-modify-write cycle of the system shown in FIG. 3.

FIG. 4 is a diagram showing the various signal configurations which are utilized to perform the read-modify-write operation. This diagram shows the row activation strobe (RAS) and the column activation strobe (CAS) signals. It should be understood that there is a CAS signal for each data byte being written and if this signal is not activated for any one byte indicating that this byte is not being rewritten, this high level will implement the R-M-W cycle. This signal is generated by the R-M-W logic 50. The RAS signal as shown is generated by the CPU on the system. The Output Enable (OE) signal also is generated by the R-M-W logic 50 as is one write enable signal (WE). A second write enable (WE) signal is generated by the system as are the address (ADDR) signals. As indicated, if any one of the four bytes is not to be written, then one of the CAS signals will be held high; and, a read-modify-write cycle will be performed if any of the CAS signals are not active, i.e. held high. If all of the CAS signals are active a writing of the four bytes is done as previously described with no read-modify-write operation and the system operates in a conventional manner. However, the system, whenever sending less than four CAS enable signals, will then provide the additional timing within the system to allow for the read-modify-write operation to be performed.

Figure 5:
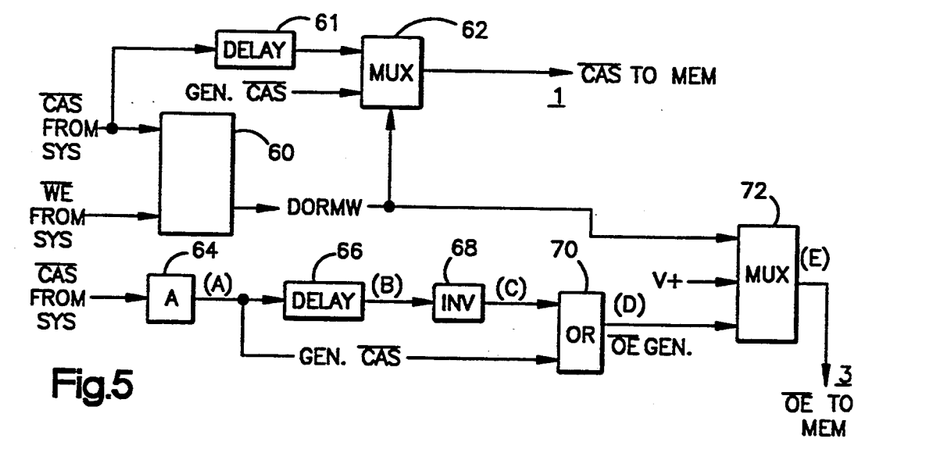
FIG. 5 is a block diagram showing the logic for generating signals for the write and R-M-W operation and showing the generation of certain timing requests.
Figure 5A:
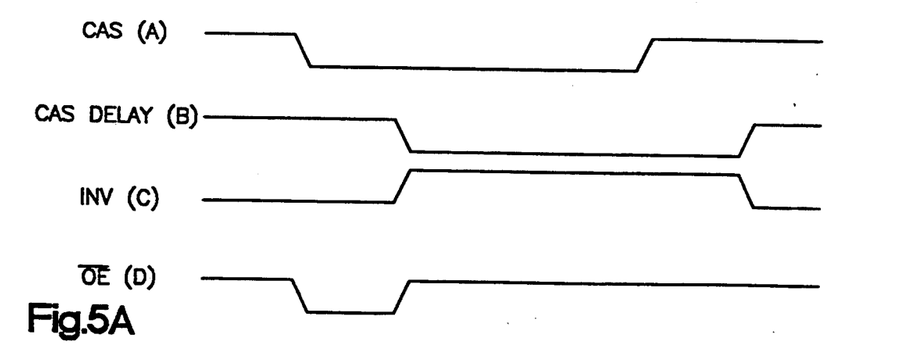
FIG. 5A shows the signals as generated by the logic of FIG. 5.
Figure 6:
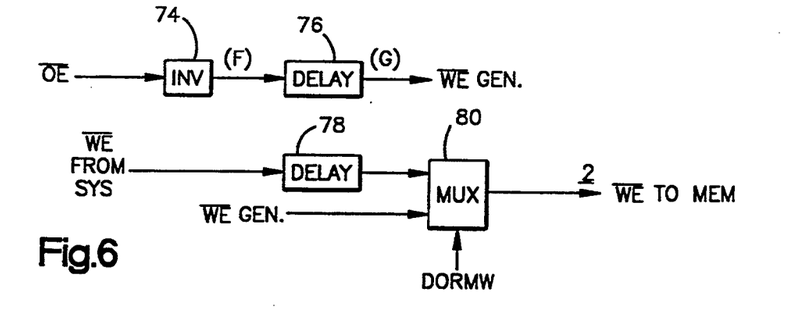
FIG. 6 is a block diagram showing the logic for generating other requests for the write and R-M-W operation.
Figure 6A:
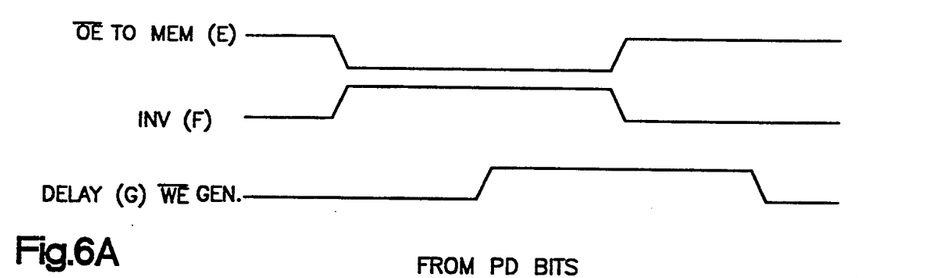
FIG. 6A shows the signal as generated by the logic of FIG. 6.

The logic blocks in the ECC timing generator 50 for the read-modify-write cycles is shown in FIGS. 5 and 6, and the signals generated are shown in FIGS. 5A and 6A, respectively, which provide an output enable to memory. As seen in FIG. 5, the CAS and WE signals are delivered from the system to a combination logic gate 60. The CAS signal is also provided through a delay 61 to a multiplexer 62 which has an output of a CAS to memory and labelled point 1. The combination logic gate 60 provides a signal responsive to the proper combination of the CAS and WE signals from the system to generate a read-modify-write (R-M-W) signal which is gated to the multiplexer 62 and also to multiplexer 72 to provide a selection operation for OE to memory labelled point 3. The CAS signals from the system are also provided through AND gate 64 generating a CAS enable if any of the CAS signals are active low. The gate 64 also provides a signal to a delay 66 which provides an output to an inverter 68 which in turn provides a signal to an OR-gate 70 which also receives an input from the gate 64. Output from the OR-gate 70 is an OE signal supplied to a multiplexer 72 which also receives a select signal from the combination logic gate 60. With all the proper combinations of signals, if a read-modify-write operation is to be provided, the multiplexer 72 will provide an output enable signal to allow the memory to read the complete data word. If not selected for R-M-W operation, the OE to memory, point 3, is held inactive high. The timing from the CAS, the CAS delay, the inverter and the output enable shown at points A, B, C, and D in FIG. 5 are shown in the timing diagram of FIG. 5B.

FIG. 6 also shows part of the logic ECC timing generator 50 for doing the R-M-W operation. When output enable is sent to memory and also sent to inverter 74 which provides a signal (F) to a delay 76 which provides an output which is a write enable generator (G). The write enable from the system also goes to a delay 78 which in turn provides an output to multiplexer 80. The write enable signal from the timing generator provides a WE to memory point 2 when the R-M-W is received at the multiplexer 80. The signals are shown in FIG. 6A of the output from memory, converter, and the signal shown at points E, F, and G in FIG. 6. Also, the output enable to memory is used to actuate correct data latch 52 (FIG. 3) and supplies R-M-W signal switch to multiplexer 40 responsive to a R-M-W signal from the ECC timing generator 50. It is to be understood that the performance of read-modify-write cycles is per se known.

The logic shown in FIGS. 5 and 6 causes the memory to read the data bytes to syndrome decode table 46 as indicated previously which are then written to the corrected data latch 52 which corrected data latch when activated will write those bits to the multiplexer 40 and there the data bytes which are read from memory are multiplexed with the new data bytes written by the CPU as indicated previously and are read to the selector 42, and then to check bit generator 44 in which check bits are generated all as previously described all as shown in FIG. 3.

One of the important features of the present invention is that these cards can be used on systems which do not contain error correction code logic within but only parity, but which cards will be prevented from being utilized in systems which have error correction codes within the system itself. The requirement of this is that this be done on cards having conventional design. The conventional card contains seventy-two contact pins, most of which are used for other functions. Therefore, it is desirable to have a single pin determine whether a particular card has error correction code on the card according to the present invention or does not have it; and further, it is important that a card that has error correction code on board according to this invention not be inserted into a system which has error correction code within the system. Moreover, it is desirable to have a system which does not have error correction code within the system accept a card that does not have error correction code on board as well as accepting a card that has error correction code on board. Expressed another way, there are generally two types of systems, one which has parity generation only and not error correction code within the system and another which has error correction code within the system. There are basically three system options. First, those systems which have ECC in the system; second, those systems which have only parity in the system and do not provide wait states necessary for R-M-W, ECC on SIMMs; and third, those systems which have parity and can provide wait states for R-M-W, ECC on SIMM. It is important and desirable that a system which has error correction code within the system accept and function with cards which do not have error correction code on board but not either accept or function with cards which do have error correction code on board. Moreover, a system that has only parity and not error correction code and can provide wait states for R-M-W operations should accept cards that have either error correction code on board or cards that do not have error correction code on board. Further, a system that has only parity and cannot provide the wait states should accept only parity cards, and not those with ECC on board.

To this end, the combination of electrical circuitry to drive a particular pin high or low together with selected card geometry are provided to allow insertion of appropriate cards and prevent the insertion of cards which are not appropriate as described above.

Figure 7:
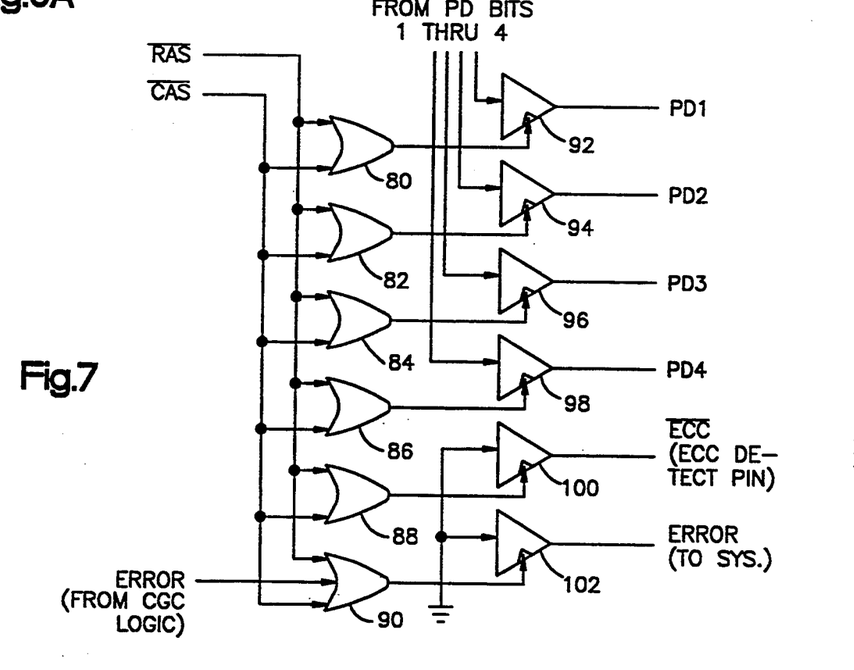
FIG. 7 is a view of an ECC card pin logic to identify a card with ECC on board.

FIG. 7 shows a high level circuit diagram of a circuit which allows that function. As shown in FIG. 7 the RAS and CAS lines are each directed to the input side of OR-gates 80, 82, 84, 86, 88, and 90. The output of the OR-gates 80, 82, 84, 86, 88, and 90 are directed respectively to a series of non-inverting buffers which are minus active enable. The buffers 92, 94, 96, and 98 have inputs from programmable presence detects on the card and the buffers 100 and 102 have grounded input. It is the output from the buffer 100 which is used to detect whether a card is compatible and the output is supplied to one of pins on the SIMM card. The reason for this configuration is that there are only a limited number of pins on an IBM or other SIMM card, and it is the pin on the card which interacts with the output of buffer 100 which configures the system at all cycles other than read or write or refresh output of buffer 100 will be high. The state will signify the card as either a conventional parity card or a card with ECC on board. As will be described presently, a card of this invention with ECC on board will be provided with a reduced height notch which will prevent if from being inserted into a system having ECC capabilities in the system.

Figure 8A:
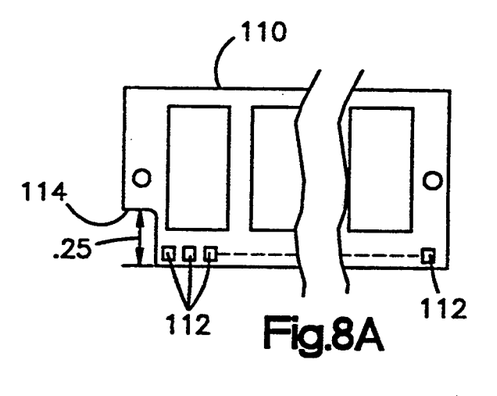
FIGS. 8A and 8B are diagrammatic representations of cards which are useful in different systems.
Figure 8B:
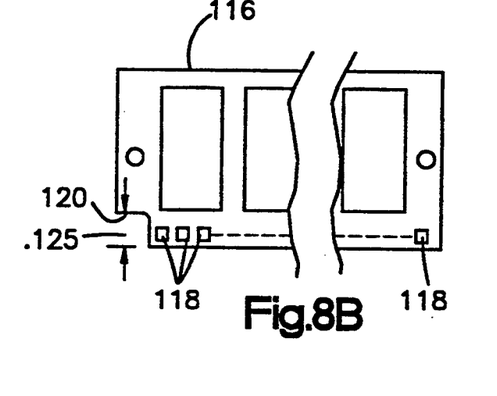

When RAS and CAS lines are both low, the output from the buffer 100 is driven low which indicates that the card is one which contains ECC R-M-W logic on board. In order to prevent the card of this invention from being inserted into a parity system without the required wait state for R-M-W, the card of this invention as shown in FIG. 8B is provided with a reduced notch height, i.e. one eighth of an inch rather than one quarter of an inch as shown in FIG. 8A. A system without the required wait states for R-M-W operation is so configured that the system will block entry of a card with only one eighth inch height, whereas it will accept a conventional parity card with a one quarter inch high notch. If the system is a system with error correction code within the system. The card of this invention with a 0.125" notch will fit the system but the pin connected to buffer 100 will be high which means the card will not work with the system and the card will be "ignored" by the system. Of course, the card of this invention with a 0.125" notch does fit into a parity system which can provide the necessary wait states for R-M-W operations.

Referring again to the system where the buffer 100 puts out a high level signal indicating it can accept either a parity card or a card that has ECC on board, the system will read the card configuration, and determine whether in fact the card is an ECC card according to the present invention or is a standard parity card which does not have error correction and respond accordingly. This is done by performing a read or a write cycle. During such a cycle (it doesn't matter which), if the pin reads low driven by logic on the card, then the card has ECC on board. If the pin reads high, then it is a standard parity card and the system does not need to provide cycle for ECC or R-M-W. Thus, a standard parity system with minor modifications can accept a card with ECC on board or a standard parity card.

As indicated above, a feature of the present invention is the provision of SIMM card geometry that prohibits the insertion of SIMM having Error correction code according to this invention into a parity system which does not have the necessary wait states for R-M-W operations. FIG. 8A shows a standard parity SIMM card with a 36 bit data pin configuration and FIG. 8B shows a SIMM according to this invention with a 40 bit data pin configuration or a card with R-M-W or ECC on board. Referring to FIG. 8A SIMM card 110 has a plurality of electrical contacts or pins 112 some of which are shown rather schematically along the edge thereof. These are the contacts which must be engaged when the card is inserted into the CPU. The card 110 includes a notch 114 in one corner which is 0.25" high. FIG. 8B shows a SIMM card 116 for use in a system that supports error correction code logic on the SIMM card. The card 116 has contacts or pins 118 similar to contacts 112 on card 110. Card 116 also has a notch 120 in one corner, but the notch 120 is only 0.125" in height. This reduced size notch 120 in the card 116 prevents the card from being used in a system that does not support ECC on SIMM's but allows for either the card 110 or card 116 to be used in a straight parity system as described above.

The output signal from buffer 100 is supplied to one of the pins or contacts 112 or 118 to signify whether the system is a system with ECC on board or a parity system; and only a parity system having sufficient wait states for R-M-W operations will accept the card 116 with a 0.125" notch, as described above. The selected pin or contact 112 or 118 is one that is normally not used for data transfer during operation of the system. Such selection would be apparent to one skilled in the art, e.g. the/ECC pin in an IBM card.

Although one embodiment of this invention has been shown and described, various adaptations and modifications can be made without departing from the scope of the invention as defined in the appended claims.

What is claimed is:

1. A memory card adapted to interface with a computer system having an operating mode, and wherein said computer system has a write cycle, and said computer system and said card are configured to write and store data words at selected addresses on said memory card during said write cycle, wherein each data word has multiple bytes, and wherein said computer system is configured to write all of the bytes of any of said data words or write less than all of the bytes of any of said data words selectively to memory, and wherein said computer system is free of error correction code capabilities but capable of providing varying wait states during said write cycle, and wherein said computer system is configured to provide sufficient cycle time for card logic to perform read-modify-write operations to memory;

said memory card comprising;

logic to generate check bits from each data word written and logic to write each of said written data words and said check bits generated from each of said written data words to a selected memory location on said card;

logic to detect when less than all of the bytes of any of said data words are to be rewritten to a given address and to initiate a read-modify-write cycle when less than all of the bytes of any of said data words are to be rewritten;

logic to perform a read-modify-write operation wherein the bytes of a word at the given address are read from memory and multiplexed with newly written bytes by said system to form a new data word of multiplexed bytes, new check bits are generated from each new data word of said multiplexed bytes and the new data words of said multiplexed bytes and check bits that have been generated from said new data words of multiplexed bytes are written to memory, said logic to perform said read-modify-write operation including logic to generate a delay in the write cycle for a sufficient time to read from memory said data bytes at said given address, multiplex said data bytes read from memory with the newly written data bytes and write the multiplexed data bytes and the check bits generated from said new data word to memory;

logic to read the bytes of each data word and check bits from any said selected location in memory; and error correction code logic to generate syndrome bits and correct all one bit errors in said bytes of said data word read from said selected locations during said operating mode.

2. The memory card as defined in claim 1 wherein said card includes means to identify said card to a computer system as having error correction code capabilities.

3. The memory card as defined in claim 2 wherein said means to identify said card includes circuit means on said card to provide a signal to the computer system responsive to a given configuration of the computer system.

4. The memory card as defined in claim 3 wherein said given configuration is supplied by a signal from the system and received by a contact on said card.

5. The memory card as defined in claim 1 further characterized by said card having means to prevent said card from being inserted into a system which does not provide sufficient cycle time for a read-modify-write operation.

6. The memory card as defined in claim 5 wherein said means to prevent the insertion includes notch means on said card configured to prevent said insertion.

7. A computer system comprising:

a CPU;

at least one memory card adapted to interface in the computer system;

said computer system having a write cycle, and said computer system and said card being configured to write and store data words at selected addresses on said memory card during said write wherein each data word has multiple bytes, said computer system being configured to write all of the bytes of any of said data words or write less than all the bytes of any of said data words selectively to memory, said computer system being free of error correction code capabilities but capable of providing varying wait states during said write cycle, said computer system being configured to provide sufficient cycle time for card logic to perform read-modify-write operations to memory;

said memory card including:

logic to generate check bits from each data word written and logic to write each of said written data words and said check bits generated from each of said written data words to a selected memory location on said card;

logic to detect when less than all of the bytes of any of said data words are to be rewritten to a given address and to initiate a read-modify-write cycle when less than all of the bytes of any of said data words are to be rewritten;

logic to perform a read-modify-write operation wherein the bytes of a word at the given address are read from memory and multiplexed with newly written bytes by said system to form a new data word of multiplexed bytes, new check bits are generated from each new data word of said multiplexed bytes and the check bits that have been generated from said new data words of multiplexed bytes are written to memory;

said logic to perform a read-modify-write operation including logic to generate a delay in the write cycle for a sufficient time to read from memory said data bytes at said given address, multiplex said data bytes read from memory with the newly written data bytes and write the multiplexed data bytes and new check bits to memory;

logic to read the bytes of each data word and check bits from any said selected location in memory; and error correction code logic to generate syndrome bits and correct all one bit errors in said bytes of said data words read from said selected location.

8. The system and card as defined in claim 7 wherein said card includes means to identify said card to a system as having error correction code capabilities.

9. The system and card as defined in claim 8 wherein said means to identify said card includes circuit means on said card to provide a signal to the computer system responsive to a given condition of the computer system configuration.

10. The system and card as defined in claim 9 wherein said given condition is supplied by a signal from the system and received by a contact on said card.

11. The system and card as defined in claim 7 further characterized by said card having means to prevent said card from being inserted into a system which does not provide sufficient cycle time for a read-modify-write operation.

12. The system and card as defined in claim 11 wherein said means to prevent the insertion includes notch means on said card configured to prevent said insertion.

13. The system and card as defined in claim 7 wherein said system includes means to detect whether said system is entering a cycle wherein all the bytes of the data word are being rewritten or less than all of the bytes are being rewritten, and means to provide the required wait states for each.

14. In a computer system including a CPU having an operating cycle; at least one memory card adapted to interface in the computer system; said computer system having a write cycle and said computer system and said card being configured to write and store data words at selected addresses on said memory card during said write cycle, wherein each data word has multiple bytes, said computer system being configured to write all of the bytes of any of said data words or write less than all the bytes of any of said words selectively to memory, said computer system being free of error correction code capabilities but capable of providing varying wait states during said write cycle, said computer system being configured to provide sufficient cycle time for card logic to perform read-modify-write operations to memory;

said memory card including:

logic to generate check bits from each data word written and logic to write each of said written data words and said check bits generated from each of said written data words to a selected memory location on said card;

a method of operating the computer system to perform a read-modify-write function comprising the steps of:

first detecting when less than all of the bytes of a data word are to be rewritten to a given address and initiating a read-modify-write cycle;

thereafter performing a read-modify-write function wherein the bytes of a data word at the given address are read from memory and multiplexed with newly written bytes from said system that are to be rewritten to generate a new data word of multiplexed bytes, generating check bits to form new data words of multiplexed bytes, and writing the new data word of multiplexed bytes and check bits generated by said new data words of multiplexed bytes to memory;

after detecting when less than all of the data bytes are to be rewritten, generating a delay in the write cycle for a sufficient time to read said bytes of said data word at said given address from memory, multiplexing said read bytes of the data with the newly written data bytes and writing the new data word of the multiplexed data bytes and check bits generated from the new data word of multiplexed bytes to memory;

thereafter reading the bytes of each data word and check bits from selected locations in memory;

thereafter generating syndrome bits and correcting all one bit errors in said bytes of said data words read from selected locations.

15. The machine executed steps as defined in claim 14 including the steps of detecting whether said system is entering a cycle wherein all the bytes of the a word are being rewritten or less than all of the bytes of a data word are being rewritten, and providing the required wait states for each cycle.

16. The machine executed steps as defined in claim 14 including the step of detecting whether the card has error correction code capabilities.

* * * * *